(12) United States Patent
Krahn et al.

(10) Patent No.: US 6,904,415 B2
(45) Date of Patent: *Jun. 7, 2005

(54) IMPORTING AND EXPORTING PARTIALLY ENCRYPTED CONFIGURATION DATA

(76) Inventors: James E. Krahn, 900 W. Meander Ct., Eagle, ID (US) 83616; David K. Poole, 3017 N. 5 Mile, Boise, ID (US) 83713; Jody L. Terrill, 4027 N. Mint Ave., Boise, ID (US) 83703

(*) Notice: Subject to any disclaimer, the term of this patent is extended or adjusted under 35 U.S.C. 154(b) by 644 days.

This patent is subject to a terminal disclaimer.

(21) Appl. No.: 09/876,922

(22) Filed: Jun. 6, 2001

(65) Prior Publication Data

US 2001/0027442 A1 Oct. 4, 2001

Related U.S. Application Data

(63) Continuation of application No. 08/953,939, filed on Oct. 20, 1997, now Pat. No. 6,292,790.

(51) Int. Cl.[7] .............................................. G06F 17/60
(52) U.S. Cl. ............................. 705/50; 700/79; 713/151
(58) Field of Search .............................. 705/50, 1, 51, 705/52, 53, 54, 55, 56, 57, 58, 59; 707/204, 10; 713/151, 155; 700/79

(56) References Cited

U.S. PATENT DOCUMENTS 5,175,800 A * 12/1992 Galis et al. .................. 706/45
5,241,594 A * 8/1993 Kung ........................... 713/151
5,640,567 A * 6/1997 Phipps ......................... 717/121
5,721,924 A * 2/1998 Kitadate ....................... 717/131
5,742,677 A * 4/1998 Pinder et al. ................ 380/242
5,778,395 A * 7/1998 Whiting et al. ............. 707/204
5,812,398 A * 9/1998 Nielsen ........................ 713/200
5,819,296 A * 10/1998 Anderson et al. ........... 707/204
5,883,956 A * 3/1999 Le et al. ...................... 713/170
6,292,790 B1 * 9/2001 Krahn et al. ................. 705/50

FOREIGN PATENT DOCUMENTS

EP 0 887 723 A2 * 12/1998 ............. G06F/1/00

OTHER PUBLICATIONS

Stevens, W. Richard, Unix Network Programming (Prentice–Hall, 1990), pp. 24–25.*
Schneier, Bruce, Applied Cryptography, Second Edition (Wiley, 1996), pp. 30–31, 265–269, 435–436.*
Wright, Gary R., TCP/IP Illustrated, vol. 2 (Addison–Wesley, 1995), pp. 64–65.*

* cited by examiner

Primary Examiner—James P. Trammell
Assistant Examiner—Cristina Owen Sherr
(74) Attorney, Agent, or Firm—Ormiston & McKinney, PLLC

(57) ABSTRACT

An apparatus for importing and exporting computer based configuration data to and from text based files in which part of the data is encrypted for confidentiality. The apparatus allows the resulting text file to be selectively edited prior to an import, providing for flexibility on behalf of system administrators without compromising the security of encrypted data.

10 Claims, 3 Drawing Sheets

FIG. 1 configuration variable table — 345

| memory identifier | memory value | private or public | textual identifier | textual value |
|---|---|---|---|---|
| 1.3.7.1 | {4d,49,43,48,41,45,4C,4A,0} "MICHAELJ" | public | User Name | MICHAELJ |
| 1.3.8.1 | {48,41,43,4b,0} "HACK" | private | Password | 23 4A 1C 48 42 27 FC D4 |
| 4.5.2.3 | {CF,44,9C,36} "207.68.156.54" | public | Server Ip Address | 207.68.156.54 |
| 5.3.2.2 | {56,50,4e,20,23,31,0} "VPN #1" | public | System Name | VPN #1 |

350  355  360  370  375

362
362
364
366

FIG. 2 persistent configuration text file — 380

390 — System Name=VPN #1
395 — Server IP Address=207.68.156.54
400 — User Name=MICHAELJ
405 — Password=23 4A 1C 48 42 27 FC D4

IMPORTING AND EXPORTING PARTIALLY ENCRYPTED CONFIGURATION DATA

CROSS REFERENCE TO RELATED APPLICATIONS

This is a continuation of application Ser. No. 08/953,939 filed Oct. 20, 1997 now U.S. Pat. No. 6,292,790.

REFERENCES

[1] Stevens, W. Richard, *Unix Network Programming* (Prentice-Hall, 1990), pages 24–25.
[2] *ExtendNet VPN Reference Guide* (Extended Systems Inc., June, 1997)
[3] Schneier, Bruce, *Applied Cryptography*, Second Edition (Wiley, 1996), pages 30–31, 265–269, 435–436
[4] Wright, Gary R., *TCP/IP Illustrated*, Volume 2 (Addison-Wesley, 1995), pages 64–65.

FIELD OF THE INVENTION

This invention relates to an apparatus to import and export computer configuration data, part of which is confidential, to and from plain-text computer files.

BACKGROUND

Modern computing environments consist of computer networks with multiple servers for performing many varied functions. Often access to a server or other network resource is limited to users(clients) who can present proper credentials to the server. The process of identifying one's self to a computer system is generally known as authentication, and often consists of the client logging on to a system by entering a user name followed by a password. If the password entered in by the client matches that maintained in a list by the server, the user is considered authenticated, and is logged into the server. Authenticated clients are then allowed access to the resources and services provided by the particular server according to the privilege level associated with the user name.

Modern computer networks typically have multiple servers. On a computer network with multiple servers, it is often desirable to have multiple user name/password lists, and each server is generally associated with a single user name/password list. The user name/password lists are typically grouped with other server specific data. The collection as a whole represents the configuration data for a particular server.

For example, a remote access server is a device that allows remote users to access network computing resources from a remote site such as home or a customer site. The network itself generally has its own configuration data, including its own user name and password lists to authenticate users to the network at large. Thus in the general case, a remote user must authenticate to the remote access server, and then, having done that, gain access to the network itself.

Administering user name/password configuration files in a multi-server environment is difficult. It is desirable to be able to make backup copies of configuration data from each server that can be stored in a secure place on the network. The stored configuration file can be used to restore the configuration of a server that becomes corrupted. It sometimes is useful to replicate user/names and passwords across multiple servers when, for example, simultaneous user capacity is being increased by adding additional servers. The user/name password lists tend to be large and contain confidential passwords, making it impractical and undesirable to enter the data by hand, so the ability to transfer memory based server configuration data to a file is important. Such a file, however, poses security challenges, because certain configuration data, such as passwords, is confidential and should not be disclosed. One common solution for protecting passwords when written to a text file is to hash them with a one-way hash. Unix, for example, does not store the plain-text versions of passwords. Instead, Unix stores a one way hash of the password. The hashing algorithm is a well-known algorithm. When a password is presented by a user, it too is hashed with the same algorithm, and the hashes are compared to determine if the original passwords match. One limitation of one way hash schemes is that the original clear-text password is not preserved on the server which is undesirable if the plain-text password is needed for another server purpose, such as an encryption key for data files.

Another prior art solution to protect confidential passwords is to encrypt the entire configuration file; this solution suffers from the fact that the entire configuration file, including public data, is encrypted and thus unreadable and difficult to modify.

What is needed is a system for saving and restoring configuration data to and from a text file that permits editing of public configuration data, preserves the secrecy of private configuration data, and ensures that improperly modified text files by unauthorized persons are blocked from restoration on a server.

BRIEF SUMMARY AND OBJECTS OF THE INVENTION

It is an object of the present invention to provide an apparatus that allows system administrators to be able to save, restore, and replicate server configuration data such as user names and passwords into a text file without compromising the secrecy of the passwords and other secure data, and further, to allow the resulting text files to optionally be edited in part, and to be restored to the same or different virtual private network server in a secure way.

The present invention achieves this objective by introducing a novel system that allows user configuration data, including names and passwords, to be saved in a textual data file by an authorized, authenticated system administrator, who provides an additional encryption password for the data when the configuration file is created. Selected portions of the data, such as passwords and other confidential data, are encrypted prior to being written to the file. The remaining information is written in an unencrypted form. The public portion of the configuration file can be restored on any server by an administrator authenticated to that server, including an administrator who cannot provide the decryption password associated with the configuration file. The entire configuration file, including the private, encrypted data, can be restore on any server, providing that the administrator authenticated to that server also can provide the decryption password associated with the configuration file.

The present invention is particularly novel in the way it performs a restore when the data authentication fails because the system administrator cannot present the proper decryption password. The present invention discloses a system having a data decryption password associated with the configuration file, the decryption password is distinct from the authentication password needed to authenticate to a target server. Rather than simply deny a restoration if the data authentication fails, the present invention allows a system administrator authenticated to the server, but not to the data, to restore the public parts of a configuration file, thus allowing public configuration data to be replicated freely.

The present invention also allows configuration data to be selectively excluded from a restore.

BRIEF DESCRIPTIONS OF THE DRAWINGS

FIG. 1 shows a simplified example of a configuration variable table as it applies to the present invention.

FIG. 2 shows a simplified example of the text of a persistent configuration text file as it applies to the present invention.

Figure 4:
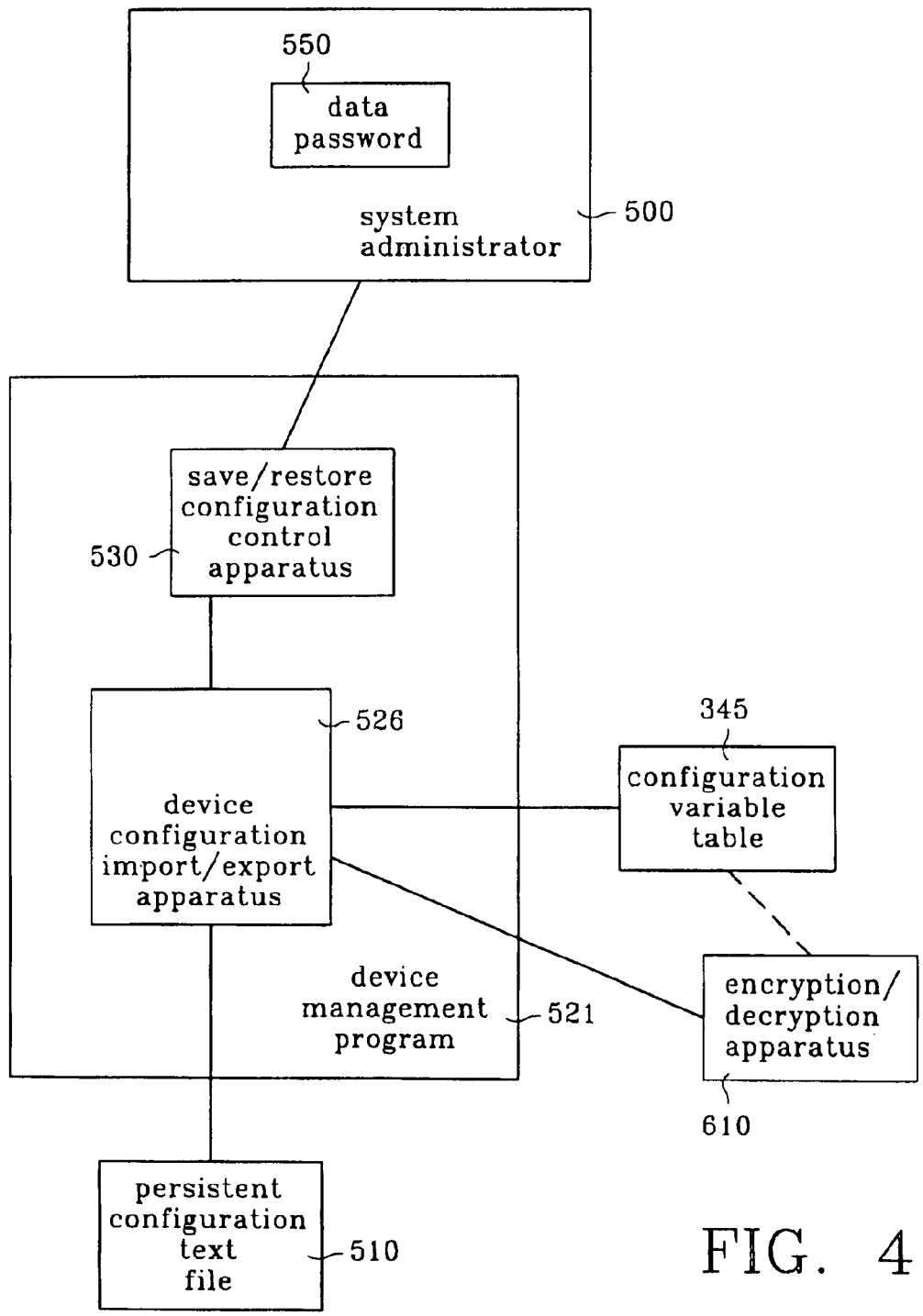

FIG. 4. is a block diagram of the present invention in a single device context.

DETAILED DESCRIPTION OF THE PREFERRED EMBODIMENT

FIG. 1 shows a simplified representation of a memory-base configuration variable table. Each row represents a memory configuration variable, each column represents an attribute of the variable thus identified. The memory identifier column 350 contains a value for identifying the configuration variable to the server. The memory value column 355 contains the current value of the identified variable. The private or public flag column 360 distinguishes private data from public data. In FIG. 1, the data enclosed in brackets in memory column 355 denotes a binary representation of sample data, the data enclosed in quotation marks denotes the clear text representation of the binary data. The private or public column 360 is used primarily to distinguish private data that is to be encrypted before being written to a configuration file from public data, written in clear-text form. The preferred embodiment uses Simple Network Management Protocol (SNMP) [4] object identifiers for the memory identifiers 350. In the preferred embodiment, user passwords, the SNMP get community name, and the SNMP set community name are private data. The remaining configuration data is public. In the preferred embodiment the configuration variable table 345 illustrated in FIG. 1 is implemented logically as described, although some of the columns are implicit. In particular, the private or public column 360 is implicitly by code logic rather than an explicit table entry.

The textual identifier column 370 denotes the textual name of the variable used to identify the variable in a configuration text file. The textual value 375 denotes the textual value of the variable as it would appear in a textual configuration file. Note that for the three public variables in FIG. 1, the textual value 375 corresponds to the clear-text value of the memory variable 355. The only private variable 360 in FIG. 1 is password, its textual value 375 is an encrypted form of the clear text value 355.

Figure 3:
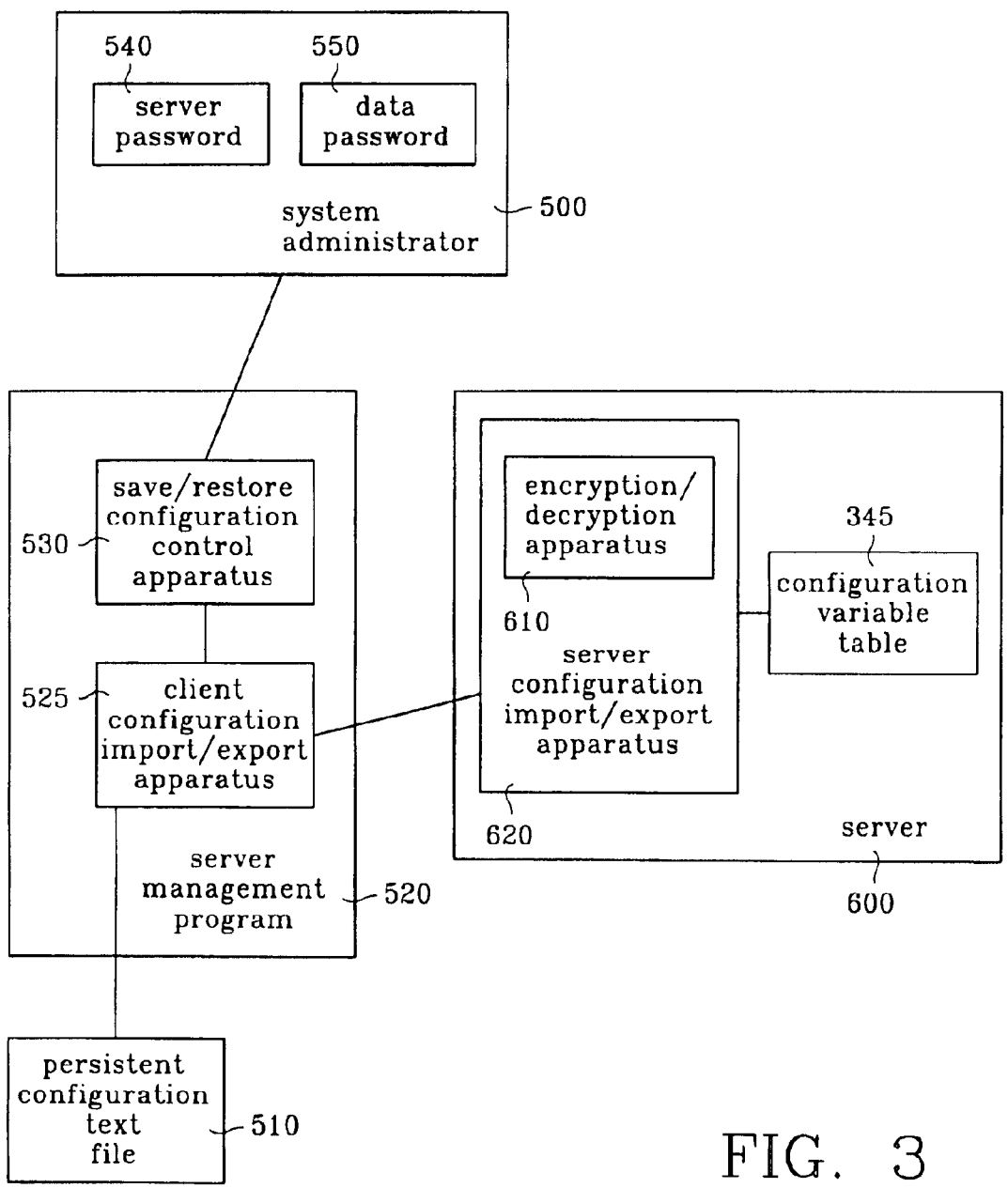
FIG. 3 is a block diagram of the present invention in a client-server context.

FIG. 3 is a block diagram that generally shows the preferred embodiment. The perferred embodiment is generally implemented as the ExtendNet VPN 1000 [2], a commercial product. The ExtendNet VPN includes both a discrete Virtual Private Network (VPN) server and a server management utility commercially known as InterprEYES. In the preferred embodiment, the server 600 is a VPN server.

The configuration variable table 345 of the preferred embodiment contains numerous variables including general configuration variables such as the system name, the system contact, the system level, a trace level for debug purposes, the admin console IP address, the admin console IPX network, and the admin console IPX node. The configuration variable table 345 in the preferred embodiment also contains a network configuration section, including a user authentication code, and a packet compression bitmask. The configuration variable table 345 in the preferred embodiment also contains a variable for each user having permission to use the VPN. Each user configuration variable includes a user name, user password, a web access flag, and an account disabled flag. The configuration variable table 345 in the preferred embodiment also contains a server TCP/IP configuration section, including an P address, a subnet mask, a default gateway, a connection timeout checking flag, a firmware update TFTP port, and a boot protocols section variable. The configuration variable table 345 in the preferred embodiment also contains a client TCP/IP configuration section including a client TCP/IP enable flag, a client-to-client communication flag, and address source variable to indicate whether client IP address come from an internal table or form a DHCP server, the primary DNS server IP address, the secondary DNS server IP address, the primary NetBios name server IP address, and the secondary NetBios name server P address. The configuration variable table 345 in the preferred embodiment also contains an IPX configuration section including an IPX enable flag, an LPX frame format variable, a SAP interval variable, a client enable flag, a client network number variable, and a client-to-client communication flag. The configuration variable table 345 in the preferred embodiment also contains SNMP configuration section including the trap community name, the get community name, and the set community name. The configuration variable table 345 in the preferred embodiment also contains a trap configuration section including an urgent traps bitmask, a warning traps lists, an information traps list, and a debug traps list.

In the preferred embodiment, the encryption/decryption apparatus 610 is a software routine deploying well known encryption algorithm Data Encryption Standard (DES) [4], and the encryption key is the data password 550. The server configuration import/export apparatus 620 is a software routine that resides within the server 600. The server configuration import/export apparatus 620 is an SNMP [4] handler, which responds to read/write requests for individual SNMP variables, each SNMP variable is defined by an object identifier descripter (OID). During an export, upon a proper request via the SNMP interface, the server configuration import/export apparatus 620 receives an SNMP request containing an OID corresponding to a memory identifier 350 of the configuration variable table 345. The corresponding memory identifier 350 and the corresponding textual value 375 are wrapped in an SNMP packet and transmitted via SNMP to the client import/export apparatus 525. The public variables are transmitted in clear text; the private variables are encrypted by the encryption/decryption apparatus 610, which is a software implementation of the well known 56 bit DES encryption algorithm. As a security measure, private data is returned via SNMP only if the server 600 is put into a private data manipulation mode via a special SNMP call. Thus, if a general SNMP client will not be able to retrieve any private data, (even though the data would be encrypted), private data transmission is intended to be limited to the server management program 520.

The server management program 520 is a Window 95/Windows NT application program. The save/restore configuration control apparatus 530 of the preferred embodiment is a Windows menu selection, well known in the art. Specifically the menu selection "File—Export Configuration" for configuration export and "File—Import Configuration" for configuration import.

In the preferred embodiment, the server password 540 is a SNMP get/set community name pair and the data password 550 is arbitrarily chosen by an authenticated system administrator 500 at the time of an export.

The client configuration import/export apparatus 525 also can optionally contain a mechanism to selectively prohibit the restoration of certain variables. This mechanism is useful in situations where a full restore would change system variables such as server passwords and addresses that are preferably left unchanged in some restorations. The mechanism typically consists of an internal table and a menu means for the system administrator 500 to identify the variables to be excluded from a restore. The table is then applied against each variable prior to it being sent to the server 600, those variables within the table are not transmitted.

OPERATION OF THE PREFERRED EMBODIMENT

Referring to FIG. 3, to save a persistent configuration text file 510, a system administrator 500 executes the server management program 520. The system administrator 500 must present the server password 540 to authenticate to the server 600, which in the preferred embodiment is a VPN server. Once authenticated, the system administrator 500 then invokes the save/restore configuration control apparatus 530 of the server management program 520. The system administrator 500 provides a data password 550 and a file name for the persistent configuration text file 510. In the preferred embodiment, the data password 550 serves both as an encryption/decryption key. The save request is transmitted to the configuration import/export apparatus 620 of the VPN server 600 via the SNMP protocol. The server configuration import/export apparatus 610 then initiates an export. The textual value 375 for each private variable is computed by encrypting the plain-text value 355 within the server 600 into an encrypted textual value 375 using the encryption/decryption apparatus 610 using an encryption key derived from the data password 550. In the preferred embodiment, the encryption/decryption apparatus 610 is a software routine deploying well known encryption algorithm DES, and the encryption key is the data password 550.

In the preferred embodiment, the client configuration import/export apparatus 525 performs the following steps when export is selected. First, the system administrator 500 is prompted via a dialog box to enter the data password 500, then prompted to re-enter the passwords for verification. Next, the system administrator 500 is prompted to enter the configuration file 510 name. The export file is opened for output. An MD4 hash digest signature of the data password 550 is written to the configuration file 510 in a textual form. The client/configuration import/export apparatus 525 contains a number of internal tables, each internal table corresponding to each section within the persistent text file 510. Each table entry consists of an SNMP object identifier descriptor (OID), a data type, and a list of enumeration constants.

As a security measure, the SNMP interface, by default, will allow private data to be read or written (even though private data, when returned, is encrypted). The client configuration import/export apparatus sends a special SNMP call to turn on private data manipulation. After the export is complete an analogous SNMP call turns off private data manipulation.

Private data manipulation is turned on. Code for each table is invoked. For each section, section headers are written. For each variable in each table, an SNMP request call containing the OID of the variable is issued. When the data is returned, the data type and the enumeration constants are used to format the response into a suitable format. After formatting, each variable is written to the configuration file 510. Each variable is written to the configuration file 510 using the textual identifier 370, followed by an equal sign, followed by the textual value 375, in a file format similar to Windows INI files. After the final section is written, the configuration file 510 is closed, and private data retrieval is turned off.

A configuration variable table 345 is restored analogously to the way it is saved. To restore a file on the same or different server 600, the system administrator 500 must first authentidate to the target server 600 by providing the server password 540 to the server 600 using the server management program 520. A restore command is issued through the server management program 520 via a menu command. The administrator 500 must then present the file name of the persistent configuration text file 510 and the data password 550, which in the preferred embodiment also serves as the decryption key. In the preferred embodiment the encryption key, decryption key, and the data password 550 are identical but in general for some encryption/decryption methods they need not be, as long as the encryption key and the decryption key can be derived from the data password 550. The save/restore configuration control apparatus hashes the data password 550 provided by the system administrator 500 into a digest form (using MD4 in the preferred embodiment) and compares this new digest against the digest in the configuration file 510. If the digests match, the system administrator 500 has entered the proper data password 550 and is authenticated and thus can import all the configuration data, including the private data. If the digests do not match, the administrator 500 is not authenticated to the data in the persistent configuration text file 510, and thus can only import memory values in sets that have no private variables. In the preferred embodiment, the non-data authenticated system administrator can import neither user names nor passwords. If the system administrator 500 is authenticated to the data, the data password 550 is transmitted to the encryption/decryption apparatus 610 of the server configuration import/export apparatus 620 by a special SNMP call.

In the preferred embodiment, a section of the persistent configuration text file 510 is processed at a time. The section header is used to locate the corresponding internal section table. Variable data for that section is read from the persistent configuration text file 510. The save/restore configuration control apparatus 530 validates that the particular variable belongs to the section. The save/restore configuration control apparatus 530 formats the value received from the persistent configuration text file 510 using the data type and enumeration constants from its internal tables into a format suitable for SNMP transmission and transmits the OID and the formatted value to the server configuration import/export apparatus 620. The encryption/decryption apparatus 610 of the server 600 decrypts the private data, and the server configuration import/export apparatus 620 updates the configuration variable table 345 to complete the restore operation. In the case of a system administrator that fails to authenticate with the data password 550, the save/restore configuration control apparatus 530 will refrain from sending any variables sets having encrypted data.

In the preferred embodiment, SNMP is used because of it common acceptance within the industry. However, an alternate embodiment would be as security improvement to encrypt the data password 550 with the SNMP set community name, and then use a secure transport such as secure sockets or the forthcoming SNMP II.

The persistent configuration text file 510 may be modified between save and restore times. Anyone who has edit access to the configuration file 510 can delete entries from the file. Anyone who has edit access to the configuration file 510 can add or modify public data. Private data can only be added by someone having edit access to the file who can also provide the correct data password 550. For example, a second persistent configuration text file 510'from a different server 600' could be generated using the same data password 550 (which would result in the same encryption key). The user names/passwords from the second file 510' could be imported/edited into the first configuration file 510, and if restored with the proper data password 550, the new records would also be imported to a target server 600.

ALTERNATE EMBODIMENT

The preferred embodiment as show in FIG. 3 is based on the client server model where the functionality is split between a client computer and a server computer. An alternate embodiment is shown in FIG. 4. In this embodiment, the invention is illustrated in a single device context. In this alternate embodiment, a single device configuration apparatus 526, contained within the server management program 520, replaces the client import/export apparatus 525 and the server configuration import/export apparatus 620 of FIG. 3 and operates on a configuration variable table 345 which generally is a software device that operates on the same computing device as the server management program 520. Alternately, the configuration variable table 345 is contained with a discrete, separate device, connected to the device configuration import/export apparatus 526 through any standard computer connectivity mechanism such as serial port, a bus interface, a network, a parallel port, and infrared or other wireless connection and the like.

The preferred embodiment described herein is not intended to limit the scope of the invention as claimed, but rather is intended to teach those skilled in the art how to make and use the preferred embodiment of the claimed invention. The present invention may be embodied in other specific forms without departing from its spirit or essential characteristics, thus the described embodiment is to be considered in all respects illustrative, not restrictive.

We claim:

1. A configuration export method enabling a system administrator having a data password to export configuration data from a configuration variable table to a persistent configuration text file, the method comprising:
    initiating an export operation;
    polling the system administrator for the data password;
    retrieving each configuration variable from the configuration variable table;
    encrypting each private configuration variable retrieved;
    encrypting the data password; and
    writing the encrypted data password and each configuration variable to the persistent configuration text file.

2. A configuration import method for enabling a system administrator having a data password to import configuration data from a persistent configuration text file to a configuration variable table, the persistent configuration text file having an encrypted data password and configuration variables denoted as public or private, the method comprising:
    polling the system administrator for the name of the persistent configuration text file and the data password;
    comparing the data password to the encrypted data password to determine if the password is authentic;
    decrypting the private configuration variable if the data password is authentic; and
    updating each configuration variable with each public and decrypted private configuration variable from the persistent configuration text file if the data password is authentic or updating each configuration variable with only each public configuration variable from the persistent configuration text file if the data password is not authentic.

3. A configuration export method enabling a system administrator having a data password to export configuration data to a persistent configuration text file, the method comprising:
    deriving an encryption key from the data password;
    defining a plurality of configuration variables with a memory identifier, a memory value, a textual identifier, and a textual value;
    denoting each configuration variable as either a private variable or a public variable;
    deriving the textual value of each configuration variable denoted a public variable from the memory value of the public configuration variable;
    encrypting the textual value of each configuration variable denoted a private variable using the encryption key;
    hashing the data password into a textual hashed digest;
    writing the textual hashed digest to the persistent configuration text file; and
    for each configuration variable, writing the textual identifier and the textual value to the persistent configuration text file, and textually associating the memory identifier and the textual value in the persistent configuration text file.

4. A configuration import method enabling a system administrator having a data password to import configuration data from a persistent configuration text file, the persistent configuration text file having a textual hashed digest and textual configuration variables, each textual configuration variable being denoted as public or private and having a textual identifier and a textual value, the method comprising:
    determining if the data password is authenticate;
    retrieving textual configuration variables from the persistent configuration text file;
    deriving a decryption key from the data password;
    decrypting the textual value of each private textual configuration variable retrieved using the decryption key;
    defining a plurality of configuration variables with a memory identifier, a memory value, a textual identifier, and a textual value;
    denoting each configuration variable as either a private variable or a public variable;
    for each textual configuration variable retrieved, deriving the memory value from the textual value of the textual configuration variable and updating the corresponding public and private configuration variables if the data password is authentic or updating only the public configuration variables if the data password is not authentic.

5. A configuration import/export method enabling a system administrator having a data password to import and export configuration data to and from a persistent configuration text file having a textual hashed digest and textual configuration variables, each textual configuration variable further comprising a textual identifier and a textual value, the method comprising:

selecting either an import or an export operation;

during an import operation, determining if the data password is authentic and retrieving textual configuration variables from the persistent configuration text file;

defining a plurality of configuration variables with a memory identifier, a memory value, a textual identifier, and a textual value;

denoting each configuration variable as either a private variable or a public variable;

deriving an encryption/decryption key from the data password;

during an export operation, encrypting the textual value of each private configuration variable or, during an import operation, decrypting the textual value of each private configuration variable during an import operation;

during an export operation, for each configuration variable, deriving the textual value from the memory value of the configuration variable or, during an import operation, deriving the memory value from the textual value of the configuration variable and updating the corresponding values of the configuration variable; and during an export operation, receiving the data password and a file name of the persistent configuration text file, hashing the data password into a textual hashed digest, writing the textual hashed digest to the persistent configuration text file, and for each configuration variable, receiving the textual identifier and the textual value, writing the textual identifier and the textual value to the persistent configuration text file, and textually associating the memory identifier and the textual value in the persistent configuration text file.

6. A computer program product having computer readable instructions that when executed cause a processor to perform a configuration export method enabling a system administrator having a data password to export configuration data from a configuration variable table to a persistent configuration text file, the method comprising:

initiating an export operation;

polling the system administrator for the data password;

retrieving each configuration variable from the configuration variable table;

encrypting each private configuration variable retrieved;

encrypting the data password; and writing the encrypted data password and each configuration variable to the persistent configuration text file.

7. A computer program product having computer readable instructions that when executed cause a processor to perform a configuration import method for enabling a system administrator having a data password to import configuration data from a persistent configuration text file to a configuration variable table, the persistent configuration text file having an encrypted data password and configuration variables denoted as public or private, the method comprising:

polling the system administrator for the name of the persistent configuration text file and the data password;

comparing the data password to the encrypted data password to determine if the password is authentic;

decrypting the private configuration variable if the data password is authentic; and updating each configuration variable with each public and decrypted private configuration variable from the persistent configuration text file if the data password is authentic or updating each configuration variable with only each public configuration variable from the persistent configuration text file if the data password is not authentic.

8. A computer program product having computer readable instructions that when executed cause a processor to perform a configuration export method enabling a system administrator having a data password to export configuration data to a persistent configuration text file, the method comprising:

deriving an encryption key from the data password;

defining a plurality of configuration variables with a memory identifier, a memory value, a textual identifier, and a textual value;

denoting each configuration variable as either a private variable or a public variable;

deriving the textual value of each configuration variable denoted a public variable from the memory value of the public configuration variable;

encrypting the textual value of each configuration variable denoted a private variable using the encryption key;

hashing the data password into a textual hashed digest;

writing the textual hashed digest to the persistent configuration text file; and for each configuration variable, writing the textual identifier and the textual value to the persistent configuration text file, and textually associating the memory identifier and the textual value in the persistent configuration text file.

9. A computer program product having computer readable instructions that when executed cause a processor to perform a configuration import method enabling a system administrator having a data password to import configuration data from a persistent configuration text file, the persistent configuration text file having a textual hashed digest and textual configuration variables, each textual configuration variable being denoted as public or private and having a textual identifier and a textual value, the method comprising:

determining if the data password is authenticate;

retrieving textual configuration variables from the persistent configuration text file;

deriving a decryption key from the data password;

decrypting the textual value of each private textual configuration variable retrieved using the decryption key;

defining a plurality of configuration variables with a memory identifier, a memory value, a textual identifier, and a textual value;

denoting each configuration variable as either a private variable or a public variable;

for each textual configuration variable retrieved, deriving the memory value from the textual value of the textual configuration variable and updating the corresponding public and private configuration variables if the data password is authentic or updating only the public configuration variables if the data password is not authentic.

10. A computer program product having computer readable instructions that when executed cause a processor to perform a configuration import/export method enabling a system administrator having a data password to import and export configuration data to and from a persistent configuration text file having a textual hashed digest and textual configuration variables, each textual configuration variable further comprising a textual identifier and a textual value, the method comprising:

selecting either an import or an export operation;

during an import operation, determining if the data password is authentic and retrieving textual configuration variables from the persistent configuration text file;

defining a plurality of configuration variables with a memory identifier, a memory value, a textual identifier, and a textual value;

denoting each configuration variable as either a private variable or a public variable;

deriving an encryption/decryption key from the data password;

during an export operation, encrypting the textual value of each private configuration variable or, during an import operation, decrypting the textual value of each private configuration variable during an import operation;

during an export operation, for each configuration variable, deriving the textual value from the memory value of the configuration variable or, during an import operation, deriving the memory value from the textual value of the configuration variable and updating the corresponding values of the configuration variable; and during an export operation, receiving the data password and a file name of the persistent configuration text file, hashing the data password into a textual hashed digest, writing the textual hashed digest to the persistent configuration text file, and for each configuration variable, receiving the textual identifier and the textual value, writing the textual identifier and the textual value to the persistent configuration text file, and textually associating the memory identifier and the textual value in the persistent configuration text file.

* * * * *

UNITED STATES PATENT AND TRADEMARK OFFICE
CERTIFICATE OF CORRECTION

PATENT NO. : 6,904,415 B2 Page 1 of 1
APPLICATION NO. : 09/876922
DATED : June 7, 2005
INVENTOR(S) : James E. Krahn et al.

It is certified that error appears in the above-identified patent and that said Letters Patent is hereby corrected as shown below:

<u>Column 4,</u>
Lines 9 and 20, replace "P" with -- IP --.
Line 17, replace "form" with -- from --.

<u>Column 6,</u>
Line 62, replace "it" with -- its --.

Signed and Sealed this

Twenty-seventh Day of June, 2006

JON W. DUDAS
*Director of the United States Patent and Trademark Office*